(12) United States Patent
Okada et al.

(10) Patent No.: US 6,907,729 B1
(45) Date of Patent: Jun. 21, 2005

(54) HYDROSTATIC TRANSMISSION

(76) Inventors: Hideaki Okada, 2-18-1, Inadera, Amagasaki-shi, Hyogo (JP); Masaru Iida, 2-18-1, Inadera, Amagasaki-shi, Hyogo (JP); Katsumoto Mizukawa, 2-18-1, Inadera, Amagasaki-shi, Hyogo (JP)

(*) Notice: Subject to any disclaimer, the term of this patent is extended or adjusted under 35 U.S.C. 154(b) by 92 days.

(21) Appl. No.: 10/421,907

(22) Filed: Apr. 24, 2003

(51) Int. Cl.$^7$ ............................................. F16D 39/00
(52) U.S. Cl. ....................................................... 60/487
(58) Field of Search ......................................... 60/487

(56) References Cited

U.S. PATENT DOCUMENTS

| | | | | |
|---|---|---|---|---|
| 5,862,664 A | * | 1/1999 | Ohashi et al. | 60/488 |
| 5,951,425 A | * | 9/1999 | Iida et al. | 60/487 |
| 6,260,339 B1 | * | 7/2001 | Abend et al. | 56/14.7 |
| 6,397,594 B2 | * | 6/2002 | Hauser et al. | 60/487 |
| 6,682,453 B1 | * | 1/2004 | Okada et al. | 60/488 |

* cited by examiner

Primary Examiner—Thomas E. Lazo
(74) Attorney, Agent, or Firm—Sterne, Kessler, Goldstein & Fox, P.L.L.C.

(57) ABSTRACT

A hydrostatic transmission including a closed fluid circuit is contained together with a deceleration gear mechanism in a housing filled with fluid so as to serve as a fluid sump. The hydrostatic transmission includes a check valve assembly in connection with the closed fluid circuit. The check valve assembly includes a vertically movable valve member, a valve seat, and a draining operation member being movable perpendicularly to the movement of the valve member. The check valve assembly has three functions. A first function of the check valve assembly is to lower the valve member by the gravity and hydraulic pressure in the closed fluid circuit so as to fit the valve member on the valve seat, thereby sealing the closed fluid circuit. A second function of the check valve assembly is to raise the valve member apart from the valve seat because the hydraulic pressure in the closed fluid circuit becomes lower than pressure in the fluid sump, thereby supplying fluid from the fluid sump to the closed fluid circuit. A third function of the check valve assembly is to raise the valve member apart from the valve seat by movement of the draining operation member, thereby draining fluid from the closed fluid circuit to the fluid sump.

9 Claims, 12 Drawing Sheets

HYDROSTATIC TRANSMISSION

BACKGROUND OF THE INVENTION

1. Field of the Invention

The present invention relates to a hydrostatic transmission (hereinafter, an "HST"), which is applicable to a transaxle apparatus.

2. Related Art

An integrated hydrostatic transaxle apparatus (hereinafter, "IHT") comprises an HST, an axle, and a drive train interposed between the HST and the axle disposed together in a common housing which is filled therein with fluid so as to serve as a fluid sump. The HST includes a hydraulic pump and motor fluidly connected through a closed fluid circuit formed in a center section onto which at least one of the hydraulic pump and motor is attached. A fluid charge valve assembly may be attached to the center section so as to supply fluid from the fluid sump to the closed fluid circuit. The fluid charge valve assembly includes a check valve allowing only a fluid flow from the fluid sump to the closed circuit.

It is sometimes necessary to drain fluid in the closed circuit to the fluid sump or partly bypass the fluid into a short circuit. For example, if a proper amount of fluid is filled in the closed fluid circuit and a vehicle having the IHT is hauled, the axle of the IHT is necessarily rotated together with the hydraulic motor and the fluid in the closed circuit transmits the rotation of the hydraulic motor to the hydraulic pump. Thus, the hydraulic pump drivingly connected to a prime mover is rotated so as to transmit an opposite force to the prime mover. The drainage of fluid from the closed fluid circuit or the bypass circulation of part of fluid taken from the closed fluid circuit solves the problem.

There are some conventional IHTs that permit drainage of fluid from the closed circuit. In these conventional IHTs, the fluid draining means is separated from the fluid charge valve assembly.

Some of various IHTs are used for a vehicle having a vertical crankshaft engine, wherein the rotary axis of the hydraulic pump of the HST must be disposed vertically, i.e., in perpendicular to the horizontal axle. Thus, if the rotary axis of the hydraulic motor of the HST is disposed horizontally, the drive train between the HST and the axle can be simplified. However, this arrangement of hydraulic motor complicates the center section having the closed fluid circuit for fluid connection of the hydraulic pump and motor. Further, output means such as a motor shaft of the hydraulic motor must be extended horizontally, thereby expanding the IHT in the horizontal direction.

If the hydraulic motor is an axial piston type hydraulic motor, arranging a vertical motor shaft serving as a rotary axis of the hydraulic motor is available to reduce the horizontal size of the IHT for a vertical crankshaft engine and to simplify the center section of the HST. However, the vertical motor shaft projects from a cylinder block of the hydraulic motor through a swash plate abutting heads of pistons fitted in the cylinder block so as to expand the IHT vertically.

Usually, the swash plate of the hydraulic motor is a fixed swash plate and a retainer for the swash plate is fixed to the IHT housing. Preferably, the retainer is attached to the IHT housing without bolts or the like so as to facilitate assembly of the IHT and reduce the number of parts. Furthermore, a horizontal transmission shaft may be interposed between the vertical motor shaft and the axle (or a differential gearing). If the IHT housing is divisible into upper and lower halves, at least one of the upper and lower halves is usually provided with an integral vertically extending portion, or with a separate member fitted thereto, so as to support a bearing for the horizontal transmission shaft. However, if the swash plate retainer is also used for supporting a bearing for the transmission shaft, the housing (or the upper and lower housing halves) can be simplified or the number of members for supporting the bearing for the transmission shaft can be reduced.

Further, if an IHT is required to be vertically small, a vertically small structure for supporting an axle without a vertically expanded additional member is desired to be provided in a housing containing an HST, especially, between a wall portion of the housing and a center section of the HST.

Moreover, the vertical motor shaft is usually fitted at one end thereof into the center section. If the hydraulic motor is provided below the center section, an upper portion of the motor shaft is inserted into the center section. Thus, assembly of the hydraulic motor with the center section can be facilitated if the motor shaft is prevented from falling from the center section after the upper portion of the motor shaft is inserted into the center section and before the hydraulic motor is completely assembled with the center section. This may also be true of the hydraulic pump.

SUMMARY OF THE INVENTION

A first object of the present invention is to provide an HST having a check valve assembly for fluid charge to a closed fluid circuit of the HST, wherein the check valve can be used for drainage of fluid in the closed fluid circuit.

To achieve the first object, an HST according to the present invention is contained together with a deceleration gear mechanism in a housing which is filled therein with fluid so as to serve as a fluid sump, wherein the HST comprises a closed fluid circuit and a check valve assembly in connection with the closed fluid circuit. The check valve assembly includes a vertically movable valve member, a valve seat, and a draining operation member being movable perpendicularly to the movement of the valve member. The check valve assembly has three functions. A first function of the check valve assembly is to lower the valve member by the gravity and hydraulic pressure in the closed fluid circuit so as to fit the valve member on the valve seat, thereby sealing the closed fluid circuit. A second function of the check valve assembly is to raise the valve member apart from the valve seat because the hydraulic pressure in the closed fluid circuit becomes lower than pressure in the fluid sump, thereby supplying fluid from the fluid sump to the closed fluid circuit. A third function of the check valve assembly is to raise the valve member apart from the valve seat by movement of the draining operation member, thereby draining fluid from the closed fluid circuit to the fluid sump.

A second object of the present invention is to provide an HST having a short motor shaft so as to reduce the size of the HST along the motor shaft.

To achieve the second object, an HST according to the present invention includes an axial piston hydraulic motor. The hydraulic motor comprises a cylinder block, a plurality of pistons fitted in the cylinder block, a thrust bearing serving as a swash plate abutting against heads of the pistons, and a motor shaft fitting with said cylinder block and extended from said cylinder block. A bearing for the motor shaft is disposed in the thrust bearing at the substantially same position with the thrust bearing in an axial direction of the motor shaft.

A third object of the present invention is to provide an HST contained together with a transmission shaft, which receives output power of the HST, in a housing, wherein an arrangement for supporting the transmission shaft is minimized, simplified and reduced in number of parts.

To achieve the third object, an HST according to the present invention comprises a hydraulic motor. The hydraulic motor includes an output shaft whose rotational force is transmitted to the transmission shaft, a cylinder block, a plurality of pistons fitted in the cylinder block, a swash plate abutting against heads of the pistons, and a retainer disposed in the housing so as to retain the swash plate. The retainer has a main cylindrical portion and a pair of feet. The main cylindrical portion is fitted to an inside portion of the housing, and one of the feet is selected to support the bearing.

Preferably, the inside portion of the housing is formed with a recess into which the main cylindrical portion of the retainer is fitted, thereby facilitating the retainer to be fixed to the housing without a bolt or another member.

Further preferably, a slant direction of the swash plate is reversed by reversing the retainer so as to select which of the pair of feet is used to support the bearing. Therefore, if a rotational direction of an axle driven by the HST is set opposite, only arranging the retainer so as to exchange the feet is required to change the slant direction of the swash plate of the hydraulic motor in correspondence to the rotational direction of the axle.

A fourth object of the present invention is to provide an appropriate structure for an axle in a narrowed space between a center section of an HST and a wall portion of a housing containing the HST.

To achieve the fourth object, an HST according to the present invention is contained together with an axle in a housing. The HST comprises a hydraulic pump including a cylinder block, a hydraulic motor including a cylinder block, and a center section forming therein a closed fluid circuit through which the hydraulic pump and the hydraulic motor are fluidly connected with each other. The axle is disposed between the cylinder blocks of both the hydraulic pump and the hydraulic motor perpendicularly to the cylinder blocks. An extended portion of the center section and an extended portion of the housing constitute a bearing for the axle.

If the housing comprises two divided portions and each of the hydraulic pump and the hydraulic motor comprises a swash plate abutting against pistons fitted in the cylinder block, one of the two divided portions of the housing may support both the swash plates, thereby reducing the size of HST in the direction perpendicular to the dividing line of the housing.

Both the cylinder blocks of the hydraulic pump and the hydraulic motor may be disposed substantially axially parallel to each other below the center section in the housing. In this case, a cylindrical fluid filter may be disposed substantially axially parallel to the cylinder blocks of the hydraulic pump and the hydraulic motor.

A fifth object of the present invention is to provide an HST including a center section and an axial piston type hydraulic unit serving as a hydraulic pump or motor, wherein, even if an axial (input or output) shaft of the hydraulic unit is disposed vertically and rotatably fitted into the center section from below, the shaft is prevented from falling from a center section before the hydraulic unit is completely assembled with the center section.

To achieve the fifth object, an HST according to the present invention comprises an axial piston type hydraulic unit assembled with a center section. The hydraulic unit includes a vertical axial shaft rotatably inserted into the center section. The shaft is fixedly provided with a pin projecting from an outer peripheral surface of the shaft. The center section includes a fluid circuit for supplying fluid to the hydraulic unit, a bottom surface onto which the hydraulic unit is fitted, and a shaft hole which is open at the bottom surface. A pin-passing groove is bored in the center section along the shaft hole and is open at the bottom surface. A pin-retaining groove, which is wider than the pin-passing groove in a peripheral direction of the shaft hole, is bored on a top end of the pin-passing groove in the center section around the shaft hole.

The shaft is inserted into the center section through the shaft hole by passing the pin in the pin-passing groove. The shaft is axially fixed in place in the center section by locating the pin in the pin-retaining groove. The shaft is rotated so as to offset the pin in the pin-retaining groove from the pin-passing groove, thereby preventing the shaft from falling down from the center section before the hydraulic unit is completely assembled with the center section.

These, other and further objects, features and advantages of the present invention will appear more fully from the following description.

BRIEF DESCRIPTION OF THE DRAWINGS/FIGURES

Figure 13:
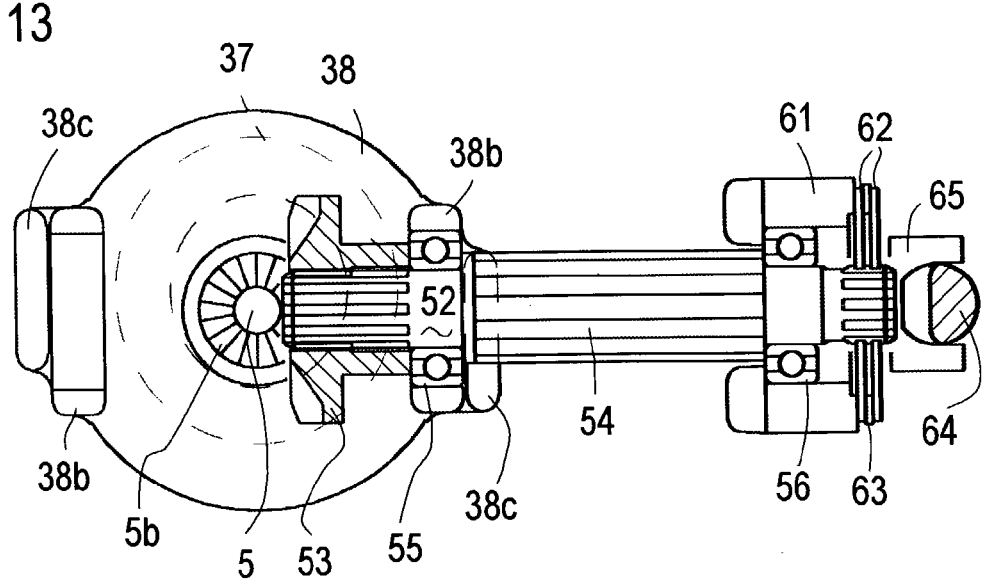

FIG. 13 is a bottom view of the motor-swash-plate retainer, the supporter, and the transmission shaft supported by the motor-swash-plate retainer and the supporter when the motor-swash-plate retainer is arranged so as to reverse the slant direction of the motor swash plate perpendicularly to the transmission shaft when viewed in plan and drive the transmission shaft in a second direction opposite to the first direction.

Figure 14:
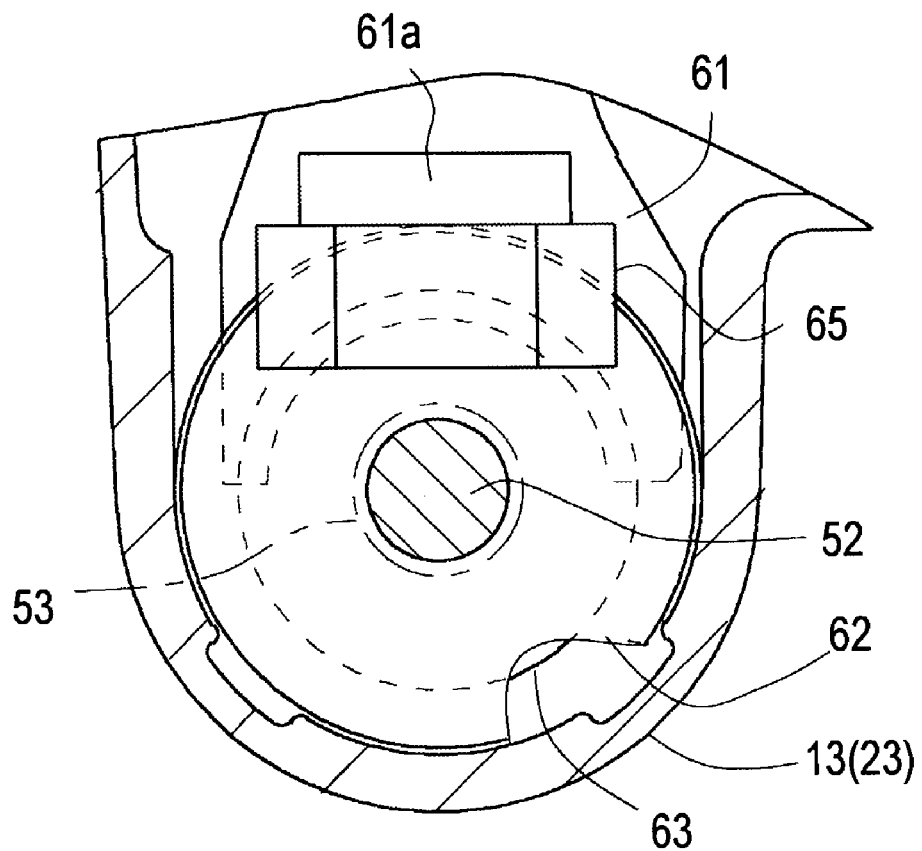

FIG. 14 is a fragmentary sectional side view of the first or second transaxle apparatus T1 or T2 showing a brake provided on the transmission shaft.

Figure 15:
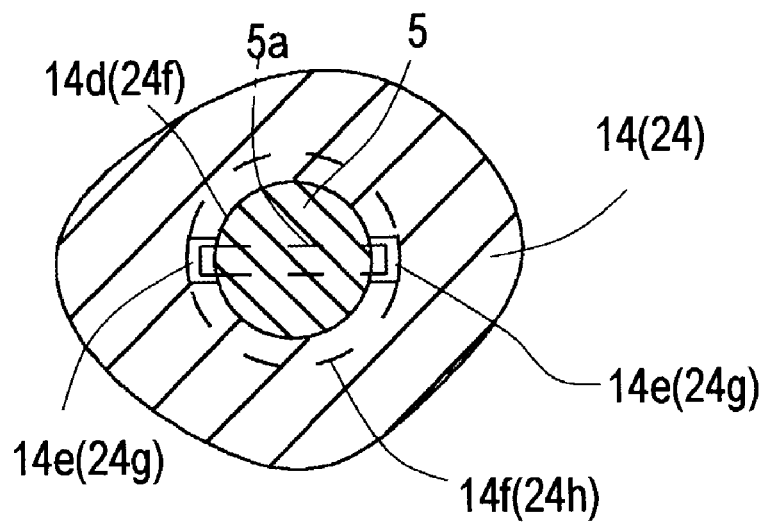

FIG. 15 is a sectional plan view of an HST center section showing a structure for preventing a motor shaft from falling from the HST center section.

DETAILED DESCRIPTION OF THE INVENTION

A first transaxle apparatus T1 shown in FIGS. 1 to 4 and a second transaxle apparatus T2 shown in FIGS. 5 to 8 will be described on the assumption that a later-discussed fluid charge valve assembly for an HST is disposed at a front end of each of transaxle apparatuses T1 and T2 while axles 6 of each apparatus are disposed laterally.

First transaxle apparatus T1 shown in FIGS. 1 to 4 is provided with a housing 11 consisting of an upper housing half 12 and a lower housing half 13. Second transaxle apparatus T2 shown in FIGS. 5 to 8 is provided with a housing 21 consisting of an upper housing half 22 and a lower housing half 23. Vertical bolts 9 join upper and lower housing halves 12 and 13 to each other, and upper and lower housing halves 22 and 23 to each other.

Each of transaxle apparatuses T1 and T2 is provided with coaxial left and right axles 6 extended laterally from each of housings 11 and 21. Axles 6 of first transaxle apparatus T1 are housed in lower housing half 13 so that a horizontal surrounding joint surface between upper and lower housing halves 12 and 13 is disposed just above axles 6. Axles 6 of second transaxle apparatus T2 are housed in upper housing half 22 so that a horizontal surrounding joint surface between upper and lower housing halves 22 and 23 is disposed just below axles 6.

Figure 2:
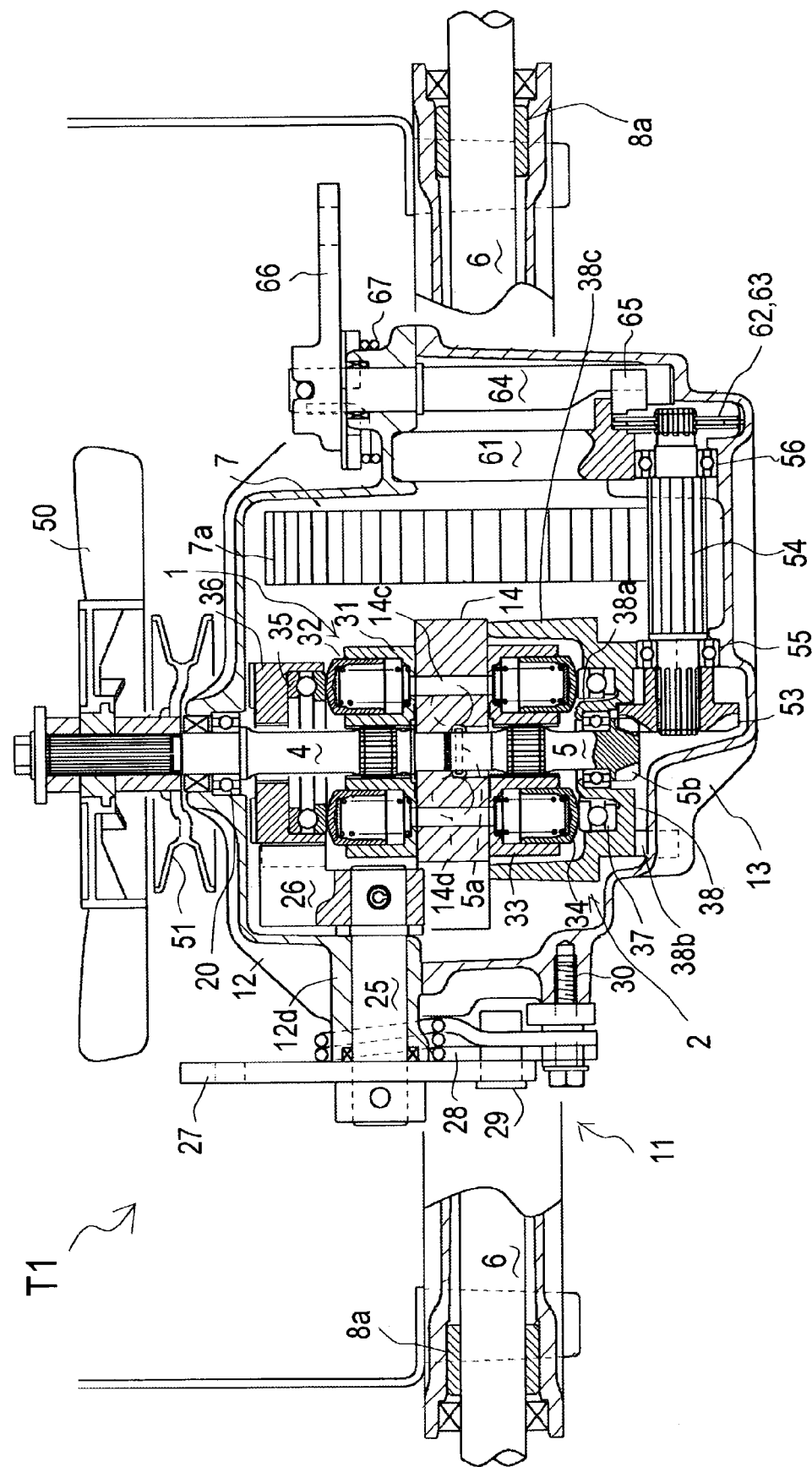
FIG. 2 is a sectional front view of first transaxle apparatus T1.
Figure 3:
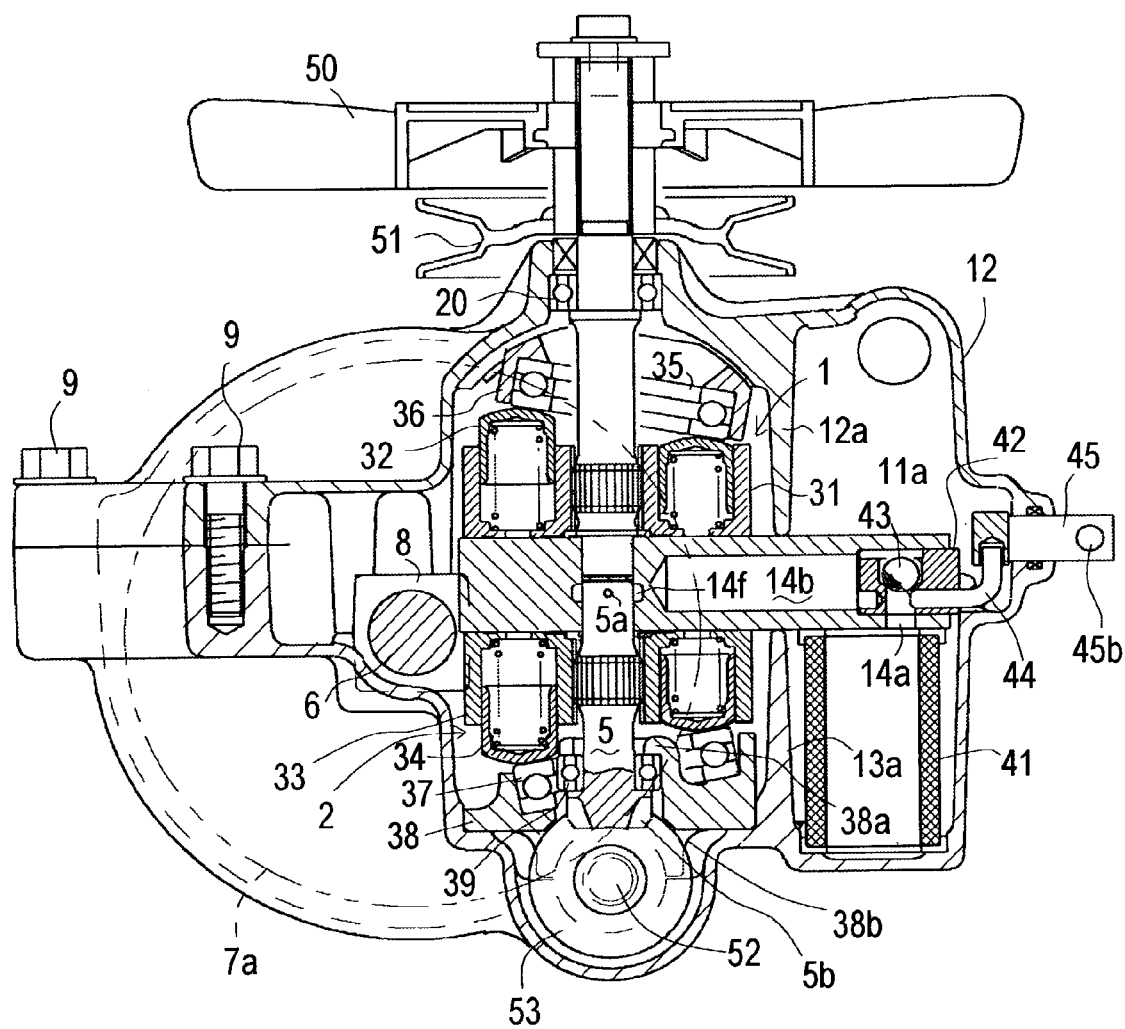
FIG. 3 is a sectional side view of first transaxle apparatus T1 showing the HST and a fluid charge valve assembly for the HST.
Figure 4:
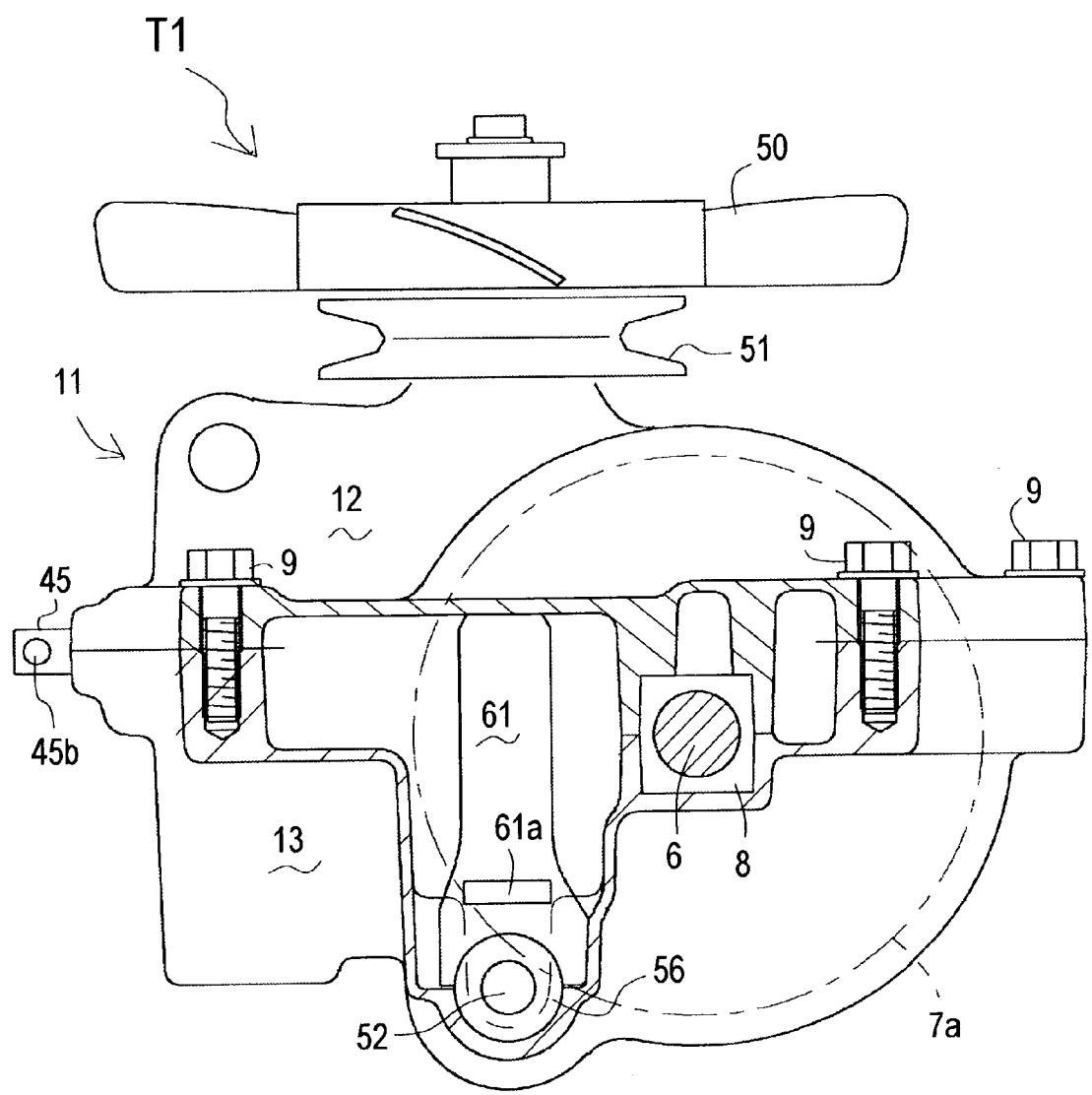
FIG. 4 is a sectional side view of first transaxle apparatus T1 showing a supporter supporting a horizontal transmission shaft while a brake is removed from the transmission shaft.
Figure 6:
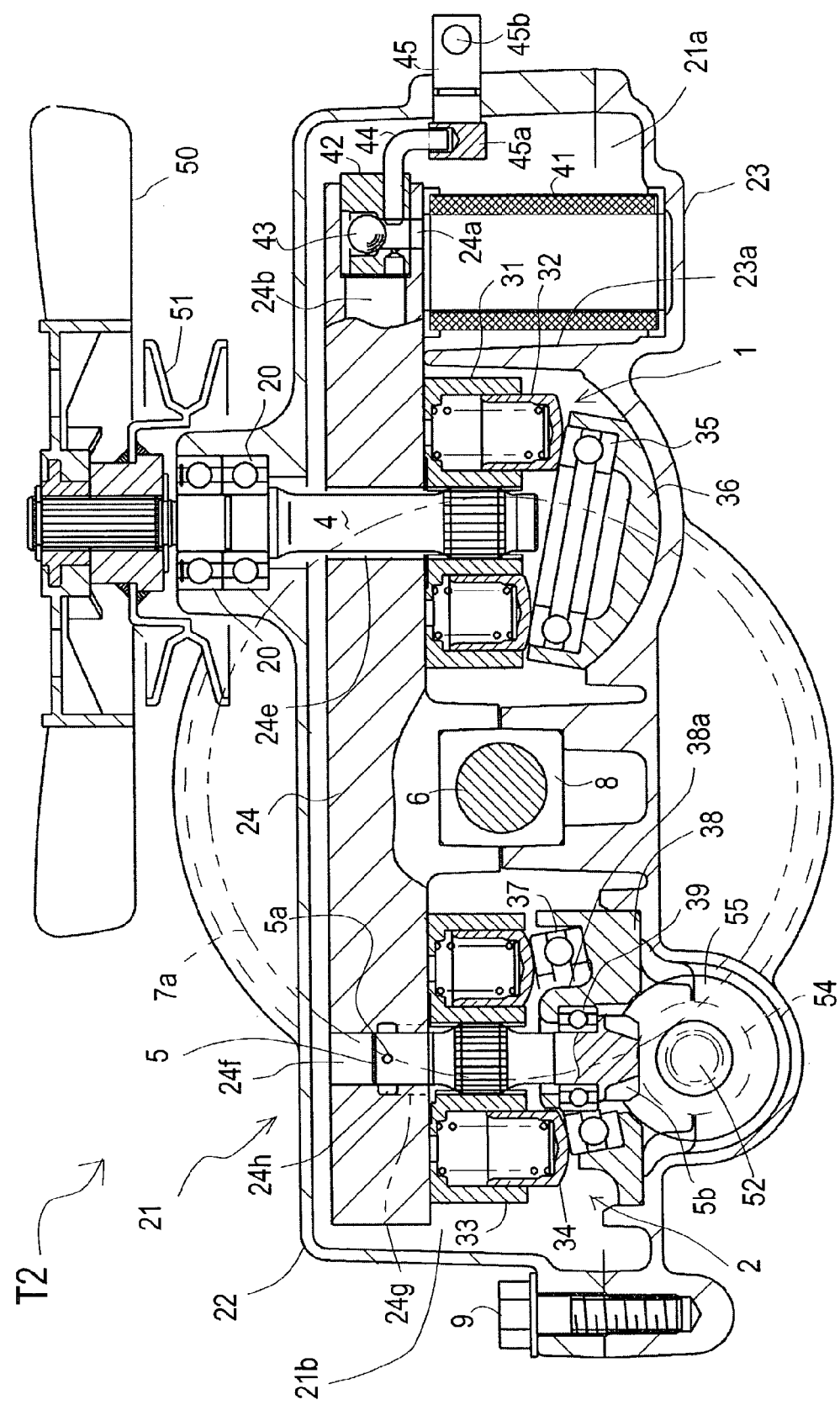
FIG. 6 is a sectional side view of second transaxle apparatus T2.

In each of housings 11 and 21, a differential gearing 7 is disposed between left and right axles 6 so as to differentially connect axles 6. A pair of bearings 8 are disposed adjacent to left and right ends of differential gearing 7, respectively, so as to journal proximal portions of axles 6. Upper and lower housing halves 12 and 13 are integrally formed with respective vertically extending portions so as to pinch bearings 8, as shown in FIGS. 2 to 4. One of bearings 8 in second transaxle apparatus T2 is pinched by upper and lower housing halves 22 and 23 formed similarly. The other of bearings 8 in second transaxle apparatus T2 is pinched between lower housing half 23 and a later-discussed center section 24, as best shown in FIG. 6. In each of transaxle apparatuses T1 and T2, a pair of bearings 8a are disposed at respective distal ends of left and right laterally extended portions of either lower housing half 13 or upper housing half 22 so as to journal distal portions of axles 6.

Figure 1:
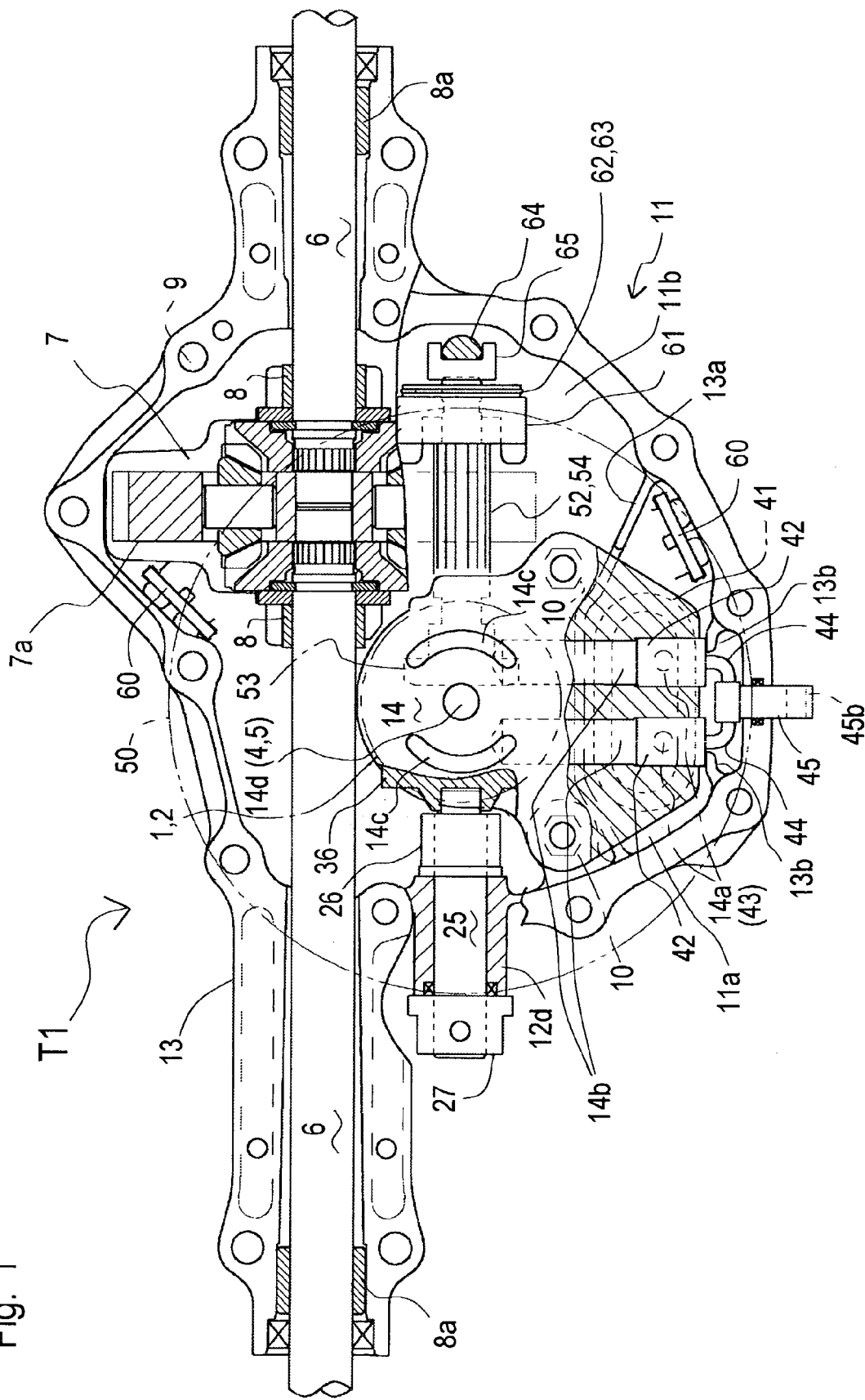
FIG. 1 is a plan view partly in section of a first transaxle apparatus T1 serving as an IHT incorporating an HST according to the present invention, from which an upper housing half is removed while a part thereof remains.
Figure 5:
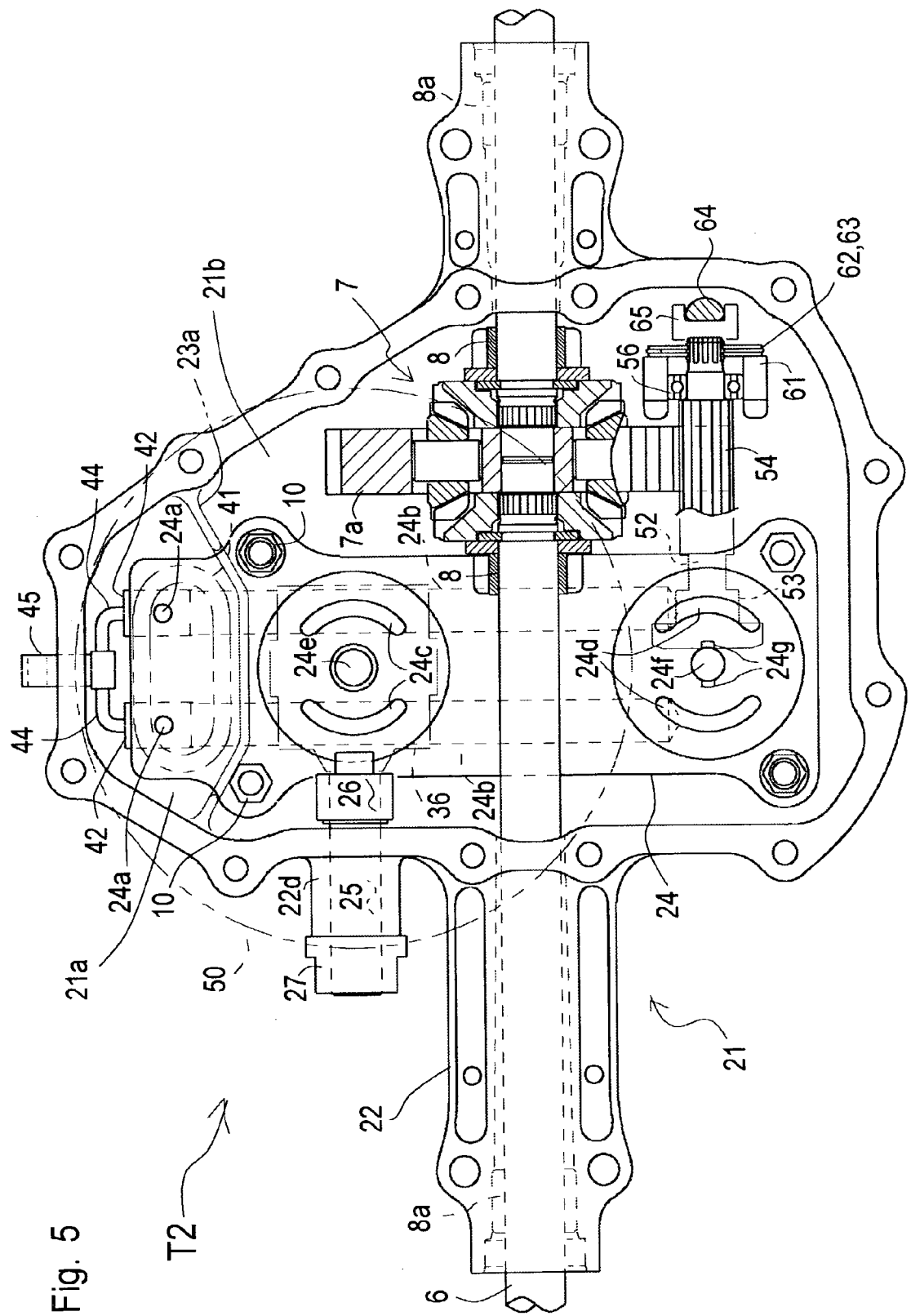
FIG. 5 is a bottom view partly in section of a second transaxle apparatus T2 serving as an IHT incorporating an HST according to the present invention, from which a lower housing half is removed while a part thereof remains.

In housing 11 of first transaxle apparatus T1 is disposed a center section 14, and in housing 21 of second transaxle apparatus T2 is disposed center section 24. Vertical bolts 10 fasten each of center sections 14 and 24 to one or both housing halves 12 and 13, as shown in FIG. 2, or one or both housing halves 22 and 23, as shown in FIGS. 1 and 5.

Each of center sections 14 and 24 is a rather thin plate-like block having horizontal flat top and bottom surfaces. While center section 14 of first transaxle apparatus T1 is disposed in front of axles 6, center section 24 of second transaxle apparatus T2 is elongated in the fore-and-aft direction perpendicularly to axles 6 so as to be disposed across one of the axles 6.

As for first transaxle apparatus T1, as best shown in FIGS. 2 and 3, a hydraulic pump 1 is mounted upward on the top surface of center section 14, and a hydraulic motor 2 is mounted downward on the bottom surface of center section 14 vertically oppositely to hydraulic pump 1, thereby constituting an HST of first transaxle apparatus T1. As for second transaxle apparatus T2, as best shown in FIG. 6, both hydraulic pump 1 and hydraulic motor 2 are mounted downward onto the bottom surface of center section 24 so that hydraulic pump 1 is disposed in front of axles 6, and hydraulic motor 2 is disposed behind axles 6, thereby constituting an HST of second transaxle apparatus T2.

As shown in FIGS. 2 and 3 or FIGS. 6 and 7, hydraulic pump 1 of each of transaxle apparatuses T1 and T2 has a pump cylinder block 31 slidably rotatably fitted onto a pump-mounting surface which is formed on the top surface of center section 14 or on the front bottom surface of center section 24. A pump shaft 4 is disposed axially in pump cylinder block 31 and not-relatively rotatably fitted with pump cylinder block 31 through splines. A plurality of pistons 32 are reciprocally fitted into pump cylinder block 31 and disposed so as to surround pump shaft 4 in parallel.

As shown in FIGS. 2 and 3 or FIGS. 6 and 8, hydraulic motor 2 of each of transaxle apparatuses T1 and T2 has a motor cylinder block 33 slidably rotatably fitted onto a motor mounting surface which is formed on the bottom surface of center section 14 or on the rear bottom surface of center section 24. A motor shaft 5 is disposed axially in motor cylinder block 33 and not-relatively rotatably fitted with motor cylinder block 33 through splines. A plurality of pistons 34 are reciprocally fitted into motor cylinder block 33 and disposed so as to surround motor shaft 5 in parallel.

As shown in FIGS. 1 and 2, center section 14 of first transaxle apparatus T1 is vertically pierced between the upper pump-mounting surface and the lower motor-mounting surface by a pair of left and right kidney ports 14c so as to fluidly connect pump and motor cylinder blocks 31 and 33 to each other. That is, only the pair of kidney ports 14c simply formed in center section 14 serve as a closed hydraulic fluid circuit between hydraulic pump 1 and hydraulic motor 2 which are aligned vertically. Moreover, a pair of left and right horizontal bores 14b are bored in center section 14 from a front end surface of center section 14 and connected at rear ends thereof to respective kidney ports 14c.

Figure 7:
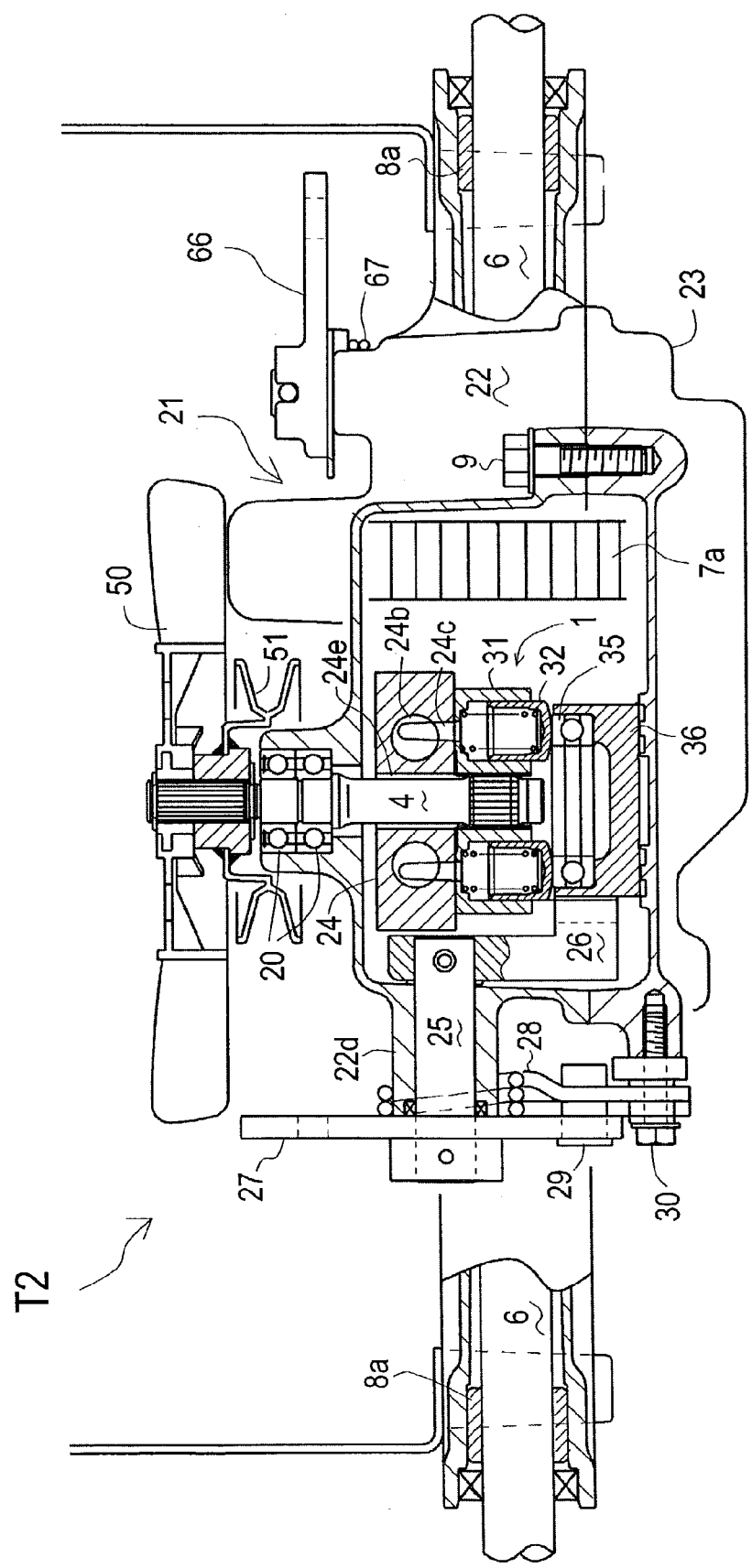
FIG. 7 is a sectional front view of second transaxle apparatus T2 showing a hydraulic pump.
Figure 8:
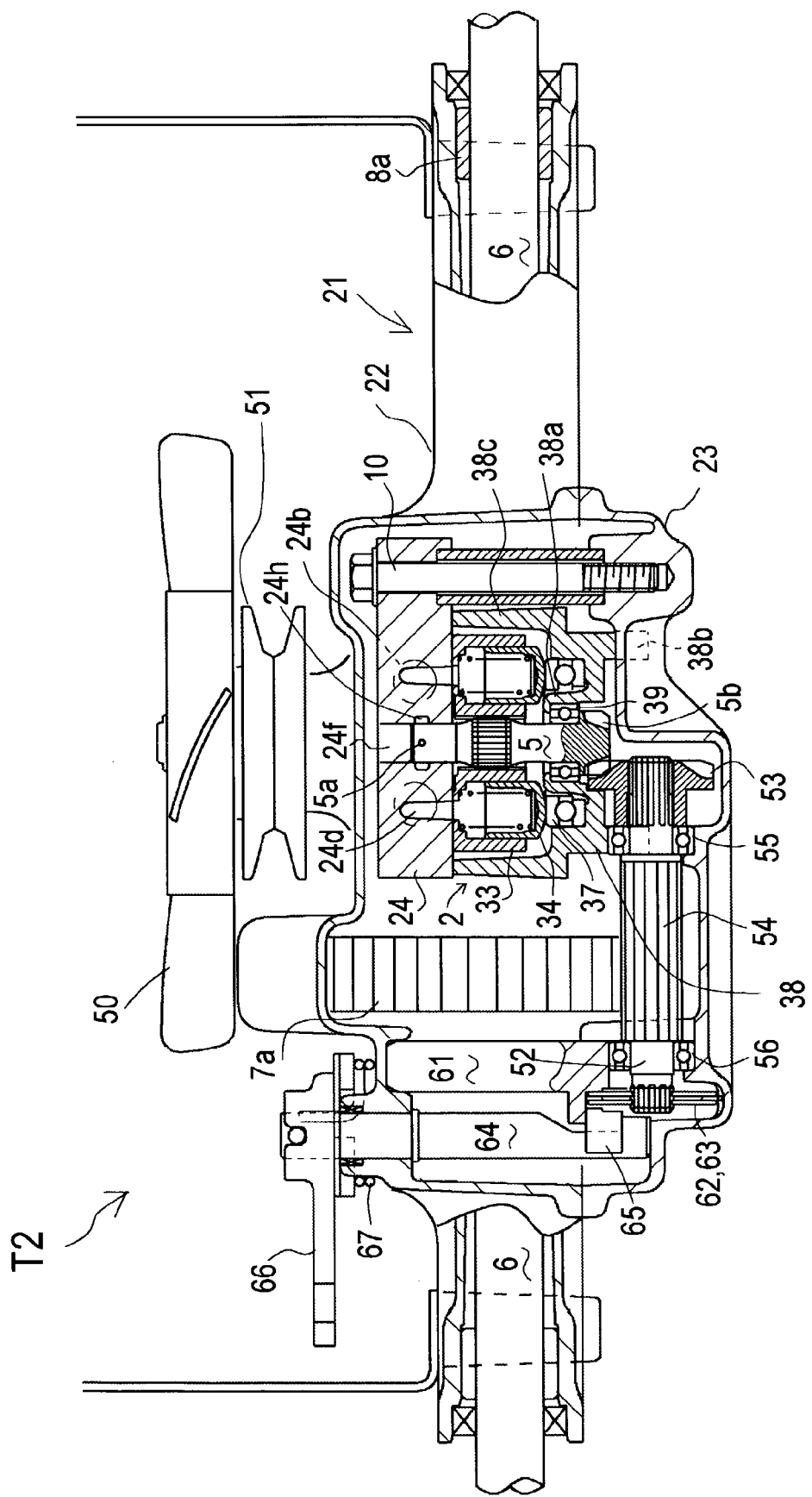
FIG. 8 is a sectional rear view of second transaxle apparatus T2 showing a hydraulic motor.

In center section 24 of second transaxle apparatus T2, a pair of left and right kidney ports 24c are recessed vertically upward and open at the pump-mounting surface as shown in FIGS. 5 and 7, and a pair of left and right kidney ports 24d are recessed vertically upward and open at the motor-mounting surface as shown in FIGS. 5 and 8. A pair of left and right horizontal bores 24b are bored in center section 24 from a front end surface of center section 24, so that left kidney ports 24c and 24d are connected to each other through left horizontal bore 24b, and right kidney ports 24c and 24d through right horizontal bore 24b, thereby constituting a closed hydraulic fluid circuit between hydraulic pump 1 and hydraulic motor 2 which are juxtaposed horizontally.

As shown in FIGS. 1 and 3, in transaxle apparatus T1, upper housing half 12 includes a vertically downward extending upper partition wall 12a, and lower housing half 13 includes a vertically upward extending lower partition wall 13a. Upper and lower vertical partition walls 12a and 13a abut against each other with center section 14 passing horizontally therebetween, thereby substantially separating a front fluid charge chamber 11a from a rear main chamber 11b in which hydraulic pump 1 and motor 2 and differential gearing 7 are disposed.

As shown in FIGS. 5 and 6, in transaxle apparatus T2, lower housing half 23 includes a vertically upward partition wall 23a so as to substantially separate a front fluid charge chamber 21a from a rear main chamber 21b in which hydraulic pump 1 and motor 2 and differential gearing 7 are disposed. Center section 24 horizontally passes just above partition wall 23a and is disposed between both chambers 21a and 21b.

As shown in FIGS. 1, 3, 5 and 6, in each of fluid charge chambers 11a and 21a of transaxle apparatuses T1 and T2, an elliptical cylindrical filter 41 is vertically disposed between the bottom surface of center section 14 or 24 and an upper bottom surface of lower housing half 13 or 23, and a fluid charge valve assembly is attached to each of center sections 14 and 24 so as to supply the closed hydraulic fluid circuit in center section 14 or 24 with fluid from the fluid sump of housing 11 or 21 through filter 41.

As shown in FIG. 1, in fluid charge chamber 11a, a vertically discoid magnet 60 is mounted upright on the upper bottom surface of lower housing half 13 adjacent to cylindrical filter 41. Also, in main chamber 11b, another magnet 60 is disposed upright on the upper bottom surface of lower housing half 13 adjacent to differential gearing 7. Iron particles generating from meshing gears or the like are stuck onto magnets 60 so as to clean the fluid sump in housing 11. Particularly, magnet 60 in fluid charge chamber 11a prevents such iron particles from invading the closed hydraulic fluid circuit of the HST. Although such magnets 60 are not shown in FIG. 5, they may be provided in housing 21 of second transaxle apparatus T2 (in both or one of chambers 21a and 21b) similarly.

The fluid charge valve assembly of first transaxle apparatus T1 will be described in accordance with FIGS. 1, 3 and 9 to 11. At the front end surface of center section 14, left and right horizontal bores 14b are open and plugged by respective valve casings 42. As shown in FIGS. 1 and 3, in center section 14, a pair of left and right vertical suction ports 14a branch downward from respective horizontal bores 14b just under respective valve casings 42 and are open at the bottom surface of center section 14 surrounded by a top edge of filter 41. A valve retaining portion 13b is formed of lower housing half 13 so as to abut against front end surfaces of valve casings 42, as shown in FIGS. 1 and 11.

As shown in FIGS. 3 and 9 to 11, each of valve casings 42 is formed therein with a vertical inlet port 42a, a horizontal outlet port 42d and a valve chamber 42c interposed between ports 42a and 42d. Inlet port 42a is open at a bottom surface of valve casing 42 for free passage to each of suction ports 14a of center section 14. Outlet port 42d is open for free passage to each of horizontal bores 14b of center section 14. A valve ball 43 serving as a main valve member is disposed in valve chamber 42c. Between inlet port 42a and valve chamber 42c is formed a valve seat 42b corresponding to valve ball 43.

As shown in FIGS. 1, 3, 9 to 11, a horizontal rod hole 42e is bored in valve casing 42 between inlet port 42a and the front end surface of valve casing 42. An outer member 45 and a pair of rods 44 serving as inner members are fixed together so as to constitute a draining operation member of the fluid charge valve assembly. Outer member 45 is disposed in front of valve casings 42 and between rods 44. The pair of rods 44 are L-like bent so as to be joined to a rear end portion 45a of outer member 45. Rods 44 are extended horizontally backward from outer member 45 and inserted into valve casings 42 through rod holes 42e, respectively, so that a rear end of each of rods 44 is disposed in inlet port 42a. Above-mentioned valve retaining portion 13b is shaped so as to allow rods 44 and rear end portion 45a of outer member 45 to pass therethrough.

Outer member 45 is extended axially horizontally so as to project forward from a front end of housing 11. As shown in FIG. 11, each of upper and lower housing halves 12 and 13 is formed at the front end thereof with a semicircular recess so as to fit an upper or lower half intermediate portion of outer member 45. Therefore, outer member 45 is sandwiched between upper and lower housing halves 12 and 13 while outer member 45 is allowed to move axially (in a fore-and-aft direction or perpendicular to axles 6).

Rear end portion 45a of outer member 45 is diametrically larger than the intermediate portion thereof held by housing 11 so as to prevent outer member 45 from escaping forward from housing 11. In other words, a position of outer member 45 and rods 44, where rear end portion 45a of outer member 45 abuts against the inner front side surface of housing 11 as shown in FIG. 9, is defined as a front limit position of the movement thereof.

Figure 10:
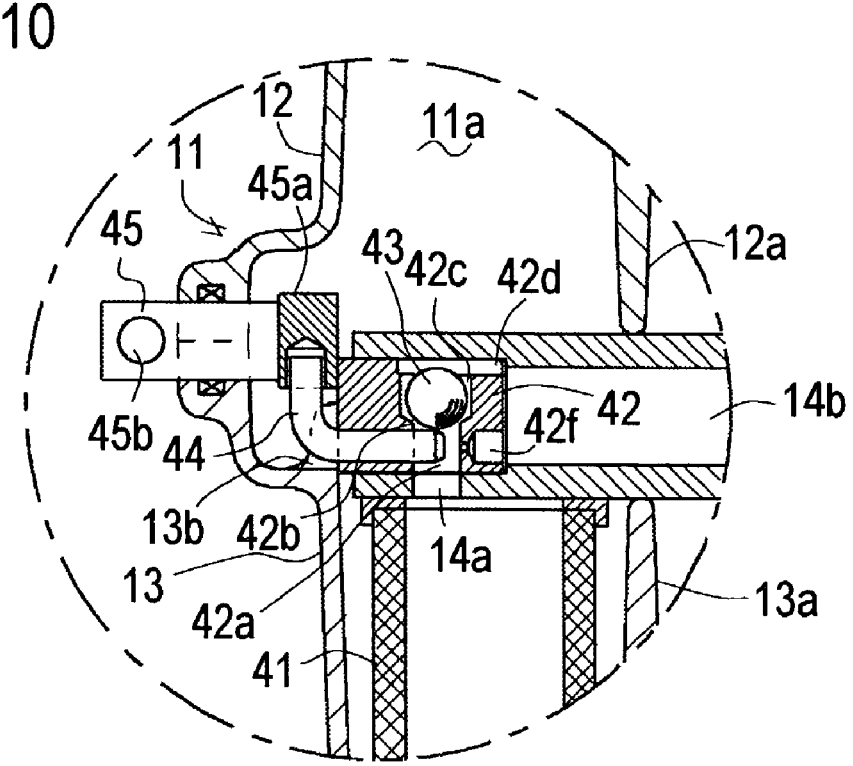
FIG. 10 is a fragmentary sectional side view of first transaxle apparatus T1 showing the fluid charge valve assembly set in a drain mode.
Figure 11:
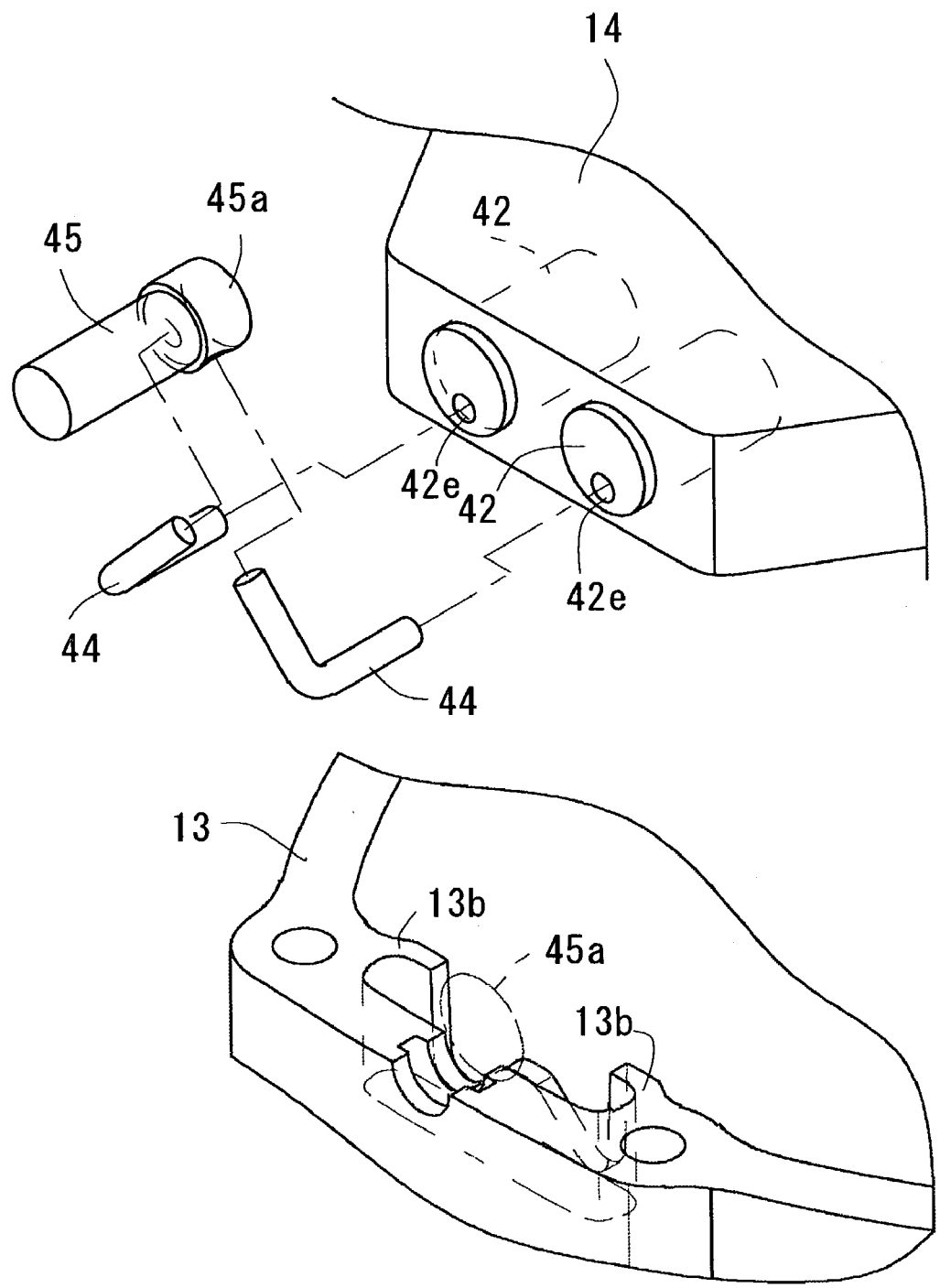
FIG. 11 is an exploded perspective view of the fluid charge valve assembly attached to a center section of the HST of first transaxle apparatus T1.

Rear end of portion 45 of axially backwardly moved outer member 45 finally comes to abut against the front end surfaces of valve casings 42, as shown in FIG. 10. This position of outer member 45 and rods 44 is defined as a rear limit position of movement of outer member 45.

Figure 9:
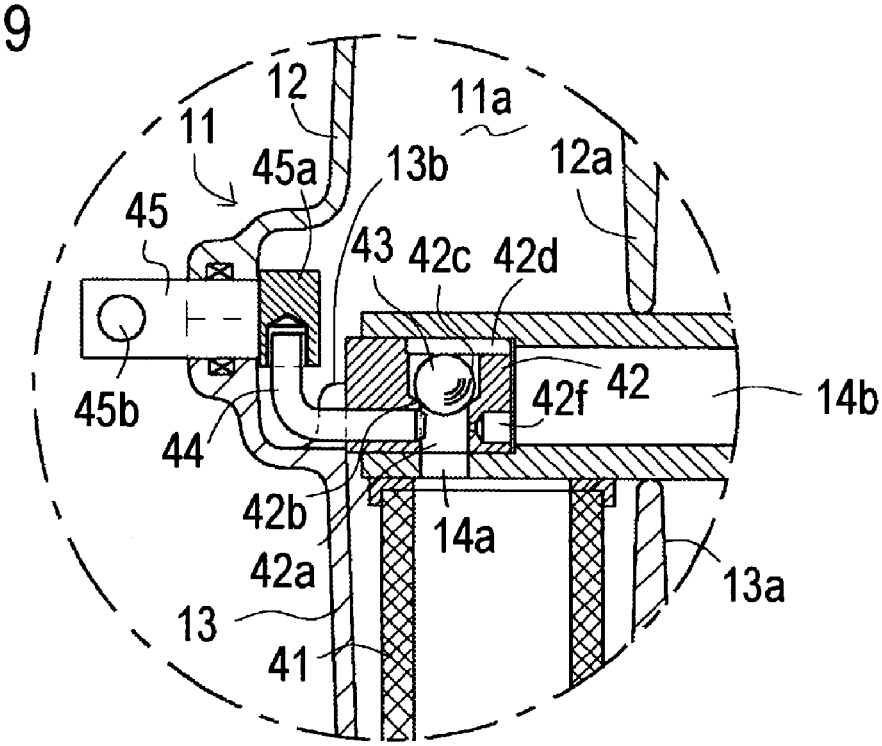
FIG. 9 is a fragmentary sectional side view of first transaxle apparatus T1 showing the fluid charge valve assembly for the HST set in a charge mode.

When outer member 45 and rods 44 are located at the front limit position, as shown in FIG. 9, the rear end of each of rods 44 is disposed in inlet port 42a, however, rod 44 is separated from valve ball 43. This state of the fluid charge valve assembly is defined as a charge mode. In this mode, valve ball 43 sits on valve seat 42b so as to prevent fluid from being drained from horizontal bore 14b to the fluid sump of housing 11, however, if the hydraulic pressure of fluid in horizontal bore 14b is reduced lower than the pressure of fluid in the fluid sump, valve ball 43 is pushed up by pressure of fluid from the fluid sump and separated from valve seat 42b, thereby supplying fluid to the closed hydraulic fluid circuit in center section 14.

When outer member 45 and rods 44 are located at the rear limit position, as shown in FIG. 10, the rear end of each of rods 44 is extended backward in inlet port 42a so as to raise valve ball 43. This state of the fluid charge valve assembly is defined as a drain mode. In this mode, valve ball 43 is constantly separated from valve seat 42b so as to allow fluid to flow freely between horizontal bore 14b and the fluid sump of housing 11 in two opposite directions, thereby allowing fluid in the closed fluid circuit in center section 14 to be drained to the fluid sump of housing 11.

Usually, outer member 45 and rods 44 are located at the front limit position so as to keep the charge mode of the fluid charge valve assembly. If the HST is required to be free from rotating axles 6, e.g., in a case of hauling a vehicle equipped with first transaxle apparatus T1, outer member 45 is pushed backward and located at the rear limit position so as to drain fluid from the HST.

If an HST is perfectly prevented from draining fluid, it is difficult to set the HST in neutral because a slight difference in the amount of flowing fluid between twin fluid passages (corresponding to the pair of horizontal bores 14b) as a closed fluid circuit of the HST often occurs. Therefore, in each of valve casings 42 is formed an orifice 42f extended from inlet port 42a so as to be open for free passage to horizontal bore 14b, whereby a little amount of fluid is allowed to be drained from the closed fluid circuit in center section 14 even if the fluid charge valve assembly is set in the charge mode.

As shown in FIGS. 1, 9 and 10, a diametrical hole 45b penetrates a portion of outer member 45 in front of housing 11. Hole 45b may be used to connect outer member 45 to a manipulator so as to facilitate the movement of outer member 45.

As shown in FIGS. 5 and 6, second transaxle apparatus T2 is provided with a similar fluid charge valve assembly, including a center section 24 having a pair of vertical suction ports 24a similar to ports 14a. However, a difference between the first charge valve assembly of transaxle apparatus T2 and the fluid charge valve assembly of first transaxle apparatus T1 is that outer member 45 is disposed lower than valve casings 42 and axially movably held by only upper housing half 22 while outer member 45 of first transaxle apparatus T1 is higher than valve casings 42 and axially movably held by upper and lower housing halves 12 and 13. In correspondence to outer member 45 disposed below valve casings 42, front portions of rods 44, which extend upward to be connected to outer member 45 of first transaxle apparatus T1, are turned to extend downward and connected to outer member 45, as shown in FIG. 6.

Since the fluid charge valve assembly is also used for drainage of fluid from the closed hydraulic fluid circuit to the fluid sump, additional parts for the drainage is unnecessary and the center section size is minimized. The center section is also simplified. Also, in first transaxle apparatus T1, center section 14 vertically sandwiched between hydraulic pump 1 and hydraulic motor 2 is close to axle 6 behind center section 14 and reduces the size of first transaxle apparatus T1 in the fore-and-aft direction (horizontally perpendicular to axles 6).

Pump and motor shafts 4 and 5 of first transaxle apparatus T1 are fitted to center section 14 in the following way. As shown in FIGS. 2, 3 and 15, center section 14 is pierced through both the top and bottom surfaces thereof, i.e., the pump and motor-mounting surfaces by a vertical shaft hole 14d surrounded by the pair of kidney ports 14c. Vertical pump shaft 4 penetrates pump cylinder block 31 so as to be axially slidably but not-relatively rotatably fitted to pump cylinder block 31 through splines. Also, vertical motor shaft 5 penetrates motor cylinder block 33 so as to be axially slidably but not-relatively rotatably fit to motor cylinder block 33 through splines. A bottom portion of pump shaft 4 and a top portion of motor shaft 5 are slidably rotatably inserted together into shaft hole 14d so that the horizontal bottom end surface of pump shaft 4 and the horizontal top end surface of motor shaft 5 face each other in shaft hole 14d while pump shaft 4 and motor shaft 5 are rotatable independently of each other.

Vertical motor shaft 5 inserted upward from below into center section 14 requires to be prevented from falling down from center section 14 before motor cylinder block 33 is fitted to motor shaft 5 and the bottom motor-mounting surface of center section 14. Therefore, as shown in FIGS. 2, 3 and 15, pin 5a diametrically (horizontally) penetrates the top end portion of motor shaft 5 and projects at both ends thereof outward from an outer peripheral surface of motor shaft 5. In center section 14, a pair of pin-passing grooves 14e are formed along shaft hole 14d and open at the bottom surface of center section 14 so as to allow both the ends of pin 5a to pass therein, thereby enabling motor shaft 5 with pin 5a to be inserted into center section 14. In a vertically intermediate portion of center section 14, a pair of pin-retaining grooves 14f are formed on respective top ends of pin-passing grooves 14e. Pin-retaining grooves 14f are horizontally (in the perpendicular direction of shaft hole 14d) wider than pin-passing grooves 14e.

Motor shaft 5 is inserted upward into shaft hole 14d from below while the ends of pin 5a pass in respective pin-passing grooves 14e. When the ends of pin 5a reach respective pin-retaining grooves 14f, motor shaft 5 is rotated to some degree around its axis so as to offset the ends of pin 5a in pin-retaining grooves 14f from pin-passing grooves 14e. Thus, bottom surfaces of pin-retaining grooves 14f prevent the ends of pin 5a from falling into pin-passing grooves 14e, thereby preventing motor shaft 5 from falling down from center section 14 and facilitating assembly of hydraulic motor 2. When hydraulic motor 2 with motor shaft 5 is completely assembled, motor shaft 5 is disposed at an axially proper position where the ends of pin 5a in pin-retaining grooves 14f are separated from the bottom surfaces of pin-retaining grooves 14f, thereby enabling motor shaft 5 to rotate freely from center section 14.

Pump and motor shafts 4 and 5 in second transaxle apparatus T2 are fitted to center section 24 in the following way. As shown in FIGS. 5 to 8, center section 24 is formed therein with a vertical motor shaft hole 24f, which is open at a center of the motor-mounting surface of center section 24 in front of axles 6. Motor shaft 5 is inserted into motor shaft hole 24f from below and located at a top end thereof in a vertically intermediate portion of center section 24. Further, center section 24 is penetrated by a vertical pump shaft hole 24e, which is open at a center of the pump-mounting surface of center section 24 behind axles 6. Pump shaft 4 vertically penetrates center section 14 through pump shaft hole 24e.

As shown in FIGS. 6 and 8 (and 15), center section 24 is formed therein with a pair of pin-passing grooves 24g and a pair of pin-retaining grooves 24h close to motor shaft hole 24f, similarly with shaft hole 14d, pin-passing grooves 14e and pin-retaining grooves 14f in center section 14 of first transaxle apparatus T1. Motor shaft 5 with pin 5a is inserted into motor shaft hole 24f from below while both ends of pin 5a pass in pin-passing grooves 24g and are located in pin-retaining grooves 24h. Thus, motor shaft 5 inserted in motor shaft hole 24f is prevented from falling out so as to facilitate assembly of hydraulic motor 2 of second transaxle apparatus T2.

In each of first and second transaxle apparatuses T1 and T2, a thrust bearing serving as a movable pump swash plate 35 abut against pistons 32 in pump cylinder block 31. A retainer 36, which can be tilted while fitting an inner surface of housing 11 or 21, holds pump swash plate 35. As for first transaxle apparatus T1, pump swash plate 35 and retainer 36 are disposed above pump cylinder block 31 mounted upright on the top surface of center section 14, and retainer 36 fits an inner ceiling portion of upper housing half 12, as show in FIGS. 2 and 3. As for second transaxle apparatus T2, pump swash plate 35 and retainer 36 are disposed below pump cylinder block 31 hung down from the bottom surface of center section 24, and a substantially vertically cylindrical main portion of retainer 36 is fitted into a recess formed in an inner bottom portion of lower housing half 23, as shown in FIGS. 6 and 7.

As shown in FIGS. 2, 3, 6 and 7, in each of first and second transaxle apparatuses T1 and T2, pump shaft 4 extends vertically upward and projects upwardly outward from housing 11 or 21 so as to be fixedly provided thereon with a cooling fan 50 and an input pulley 51 above housing 11 or 21.

As shown in FIGS. 2 and 3, as for first transaxle apparatus T1, pump swash plate 35 and retainer 36 disposed above pump cylinder block 31 are provided with center holes which pump shaft 4 penetrates freely permitting tilting of retainer 36 with pump swash plate 35. Above retainer 36, a bearing 20 is provided in a top portion of housing 11 so as to rotatably hold a vertically intermediate portion of pump shaft 4.

As shown in FIGS. 6 and 7, as for second transaxle apparatus T2, a bottom end of pump shaft 4 projecting downward from pump cylinder block 31 is disposed above pump swash plate 35 and retainer 36. In the case of second transaxle apparatus T2, a pair of upper and lower bearings 20 are disposed in a top portion of housing 21 so as to stably and rotatably hold a vertically intermediate portion of pump shaft 4. Such increase of bearings 20 enables the bottom end of pump shaft 4 to be disposed above pump swash plate 35 and retainer 36, thereby shortening pump shaft 4 and reducing the vertical size of second transaxle apparatus T2.

As shown in FIGS. 1, 2, 5 and 7, for controlling the tilt angle of pump swash plate 35, a speed control shaft 25 is disposed horizontally in parallel to axles 6, and rotatably supported by each of boss portions 12d and 22d formed of respective upper housing halves 12 and 22. In each of housings 11 and 21, an arm 26 is fixed onto an inner end portion of speed control shaft 25 and engages with retainer 36. An intermediate portion of a speed control lever 27 is fixed onto an outer end portion of speed control shaft 25 outside housing 11 or 21. Speed control lever 27 is operatively connected at an upper end thereof to a manual speed control operation device such as a lever or a pedal provided on a vehicle.

A coiled and twisted spring 28 is wound around each of boss portions 12d and 22d so as to bias speed control lever 27 toward the neutral position. A retaining pin 29 is disposed horizontally in parallel to speed control shaft 25 and fixed onto a lower end of speed control lever 27. Below retaining pin 29, an eccentric bolt 30 is disposed horizontally in parallel to retaining pin 29 and screwed into a sidewall of each of lower housing halves 13 and 23. Two end portions of spring 28 are extended downward and cross each other so as to sandwich retaining pin 29 and eccentric bolt 30 and press them toward each other. The neutral position of speed control lever 27 can be adjusted by rotating eccentric bolt 30.

When the speed control operation device on the vehicle is operated, speed control lever 27 is rotated together with speed control shaft 25 against the biasing force of spring 28 so as to tilt retainer 36 together with pump swash plate 35. According to the tilt angle and direction of pump swash plate 35, the capacity and fluid-discharging direction of hydraulic pump 1 varies, thereby rotating hydraulic motor 2 at various speeds in one selective direction of two opposite directions.

In each of first and second transaxle apparatuses T1 and T2, a thrust bearing serving as a fixed motor swash plate 37 is disposed below motor cylinder block 33 so as to abut against pistons 34 in motor cylinder block 33. A retainer 38 retains motor swash plate 37 and is fitted to a bottom portion of each of housings 11 and 21. As shown in FIGS. 2, 3, 6 and 8, a bottom portion of retainer 38 serving as a motor-shaft-support portion 38a is convexed upward so as to be inserted into a center hole of motor swash plate 37. A bottom end portion of motor shaft 5 is formed as a bevel gear which is a motor output gear 5b meshing with a bevel gear serving as a later-discussed first transmission gear 53. A portion of motor shaft 5 immediately above motor output gear 5b is supported by motor-shaft-support portion 38a of retainer 38 through a motor-shaft bearing 39. Due to this construction, the bottom end of motor shaft 5 serving as motor output gear 5b does not project or hardly projects downward from a bottom surface of retainer 38, thereby shortening motor shaft 5 and reducing the vertical size of each of transaxle apparatuses T1 and T2.

Retainer 38 extends a pair of left and right feet 38b downward from the bottom thereof. Each foot 38b includes an upper-semicircular surface so as to fit an upper half-peripheral outer surface of a transmission-shaft bearing 55 for supporting a later-discussed transmission shaft 52. Each of bottom portions 13c and 23c of lower housing halves 13 and 23 is convexed upward in a sectionally upper-half semicircular shape so as to fit the upper-semicircular surface of foot 38b. Thus, retainer 38 is disposed in each of transaxle apparatuses T1 and T2 so that one of feet 38b is fitted to transmission-shaft bearing 55.

Figure 12:
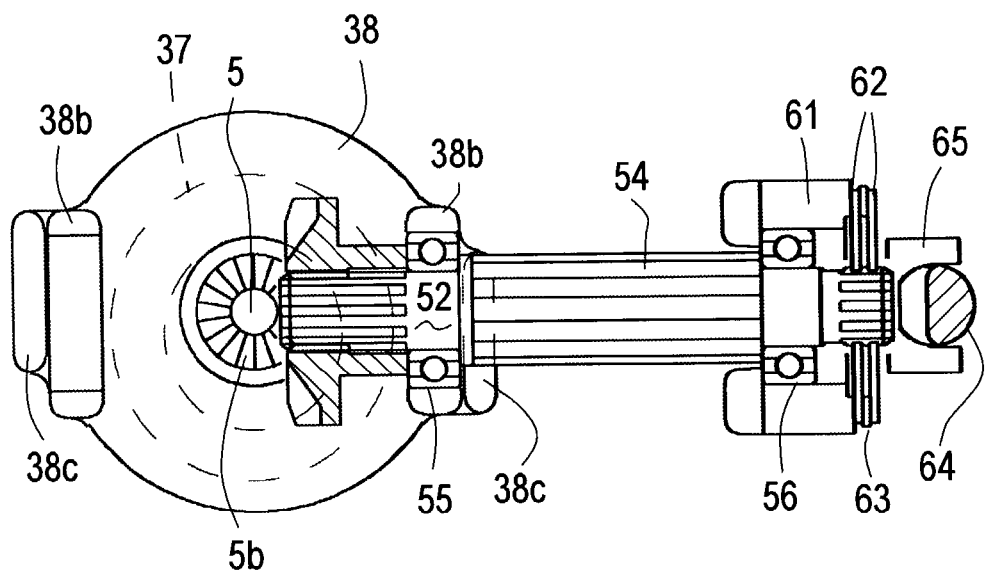
FIG. 12 is a bottom view of a motor-swash-plate retainer, a supporter, and the horizontal transmission shaft supported by the motor-swash-plate retainer and the supporter when the motor-swash-plate retainer is arranged so as to slant a motor swash plate perpendicularly to the transmission shaft when viewed in plan and drive the transmission shaft in a first direction.

In each of transaxle apparatuses T1 and T2, as shown in FIGS. 3 and 6, motor swash plate 37 in retainer 38 is disposed vertically slantwise in the fore-and-aft direction, i.e., perpendicular to axles 6, thereby being disposed eccentrically forward or rearward, as shown in FIGS. 12 and 13. Consequently, one slant direction of motor swash plate 37 in the fore-and-aft direction is selected between two mutually symmetric directions with respect to the vertical axis of motor shaft 5 depending upon which of feet 38b is fitted to transmission-shaft bearing 55, thereby deciding the rotational direction of motor shaft 5 between two opposite directions.

Retainer 38 is provided on left and right ends thereof with upwardly extending portions 38c, which contact with the bottom surface of center section 14 or 24. Thus, retainer 38 is vertically located between center section 14 or 24 and the bottom portion of housing 11 or 21 without bolts or the like.

As shown in FIGS. 1, 2, 4, 5, 6 and 8, transmission shaft 52 is disposed horizontally in parallel to axles 6 along the bottom of housing 11 or 21 (i.e., lower housing half 13 or 23). A bevel gear serving as first transmission gear 53 is fixed on a first axial end portion of transmission shaft 52 so as to mesh with motor output gear 5b. Transmission-shaft bearing 55 fitted to retainer 38 is disposed adjacent to first transmission gear 53. A second end portion of transmission shaft 52 is opposite to the first end portion thereof and provided thereon with later-discussed brake discs 62. Another transmission-shaft bearing 56 is provided on a portion of transmission shaft 52 adjacent to the second end portion thereof.

As shown in FIGS. 1, 2, 4, 5 and 8, a vertically elongated supporter 61 is disposed between a ceiling portion of housing 11 or 21 (i.e., upper housing half 12 or 22) and transmission-shaft bearing 56 adjacent to the second end portion of transmission shaft 52. As best shown in FIGS. 4 and 14, a bottom portion of supporter 61 is semicircularly curved so as to fit transmission-shaft bearing 56. The bottom portion of lower housing half 13 or 23 is formed so as to retain supporter 61 and the lower halves of the pair of transmission-shaft bearings 55, 56.

As shown in FIGS. 1, 2, 5 and 8, an outer peripheral portion of transmission shaft 52 between the pair of transmission-shaft bearings 55, 56 is formed into a second transmission gear 54, which meshes with an input gear 7a of conventionally-constructed differential gearing 7 so as to transmit power to axles 6.

As shown in FIGS. 1, 2, 5, 8 and 14, a pair (or a larger number) of vertical brake discs 62 are not-relatively-rotatably but axially-slidably fitted onto the second end portion of transmission shaft 52. A ring-like brake pad (or pads) 63 is disposed between brake discs 62 and not-relatively-rotatably but axially-slidably fitted to supporter 61 and the bottom portion of housing 11 or 21.

As shown in FIGS. 1, 2, 5 and 8, a vertical brake control shaft 64 is supported rotatably around its axis by a ceiling portion of housing 11 or 21 (i.e., upper housing half 12 or 22) and extended downward along supporter 61. A brake arm 66 is fixed onto a top of brake control shaft 64 above the ceiling portion of housing 11 or 21 so as to be operatively connected to a brake operation member, such as a lever or a pedal, provided on a vehicle. As shown in FIGS. 2 and 8, a spring 67 is wound around the ceiling portion of housing 11 or 21 so as to bias brake arm 66 (and brake control shaft 64) to a brake-release position. A lower portion of brake control shaft 64 is partly cut away and fittingly provided thereon with a cam 65, as shown in FIGS. 1, 2, 5, 8 and 14. A portion 61a of supporter 61 immediately above cam 65 is horizontally extended so as to fit brake pad 63 and cam 65.

When brake arm 66 is set in the brake-release position, the cut-away portion of brake control shaft 64 fits cam 65 so that cam 65 is disposed apart from an outermost brake disc 62, thereby separating brake discs 62 and brake pad 63 from one another so as to allow transmission shaft 52 to rotate.

When the brake operation member is handled so as to rotate brake arm 66 and brake control shaft 64 to a brake position against the force of spring 67, a cam portion of brake control shaft 64 which is each of edges of the cut-away portion thereof comes to confront and push cam 65 so that cam 65 abuts against the outermost brake disc 62, thereby pressing brake discs 62 and brake pad 63 against one another so as to brake transmission shaft 52. If an operator release the handling force from the brake operation member, brake arm 66 and brake control shaft 64 return to the brake-release position by the biasing force of spring 67.

It is further understood by those skilled in the art that the foregoing description is a preferred embodiment of the disclosed apparatus and that various changes and modifications may be made in the invention without departing from the spirit and scope thereof. For example, transmission shaft 52 and differential gear unit 7, which are arranged rightward of the HST in each of the above-mentioned two embodiments, may be arranged leftward of the HST.

What is claimed is:

1. A hydrostatic transmission including a closed fluid circuit, said hydrostatic transmission being contained together with a deceleration gear mechanism in a housing, and said housing being filled with fluid so as to serve as a fluid sump, comprising:
    a check valve assembly in connection with said closed fluid circuit, said check valve assembly including a vertically movable valve member, a valve seat, and a draining operation member movable perpendicularly to the movement of said valve member,
    wherein said valve member is lowered by gravity and hydraulic pressure in said closed fluid circuit so as to fit said valve member on said valve seat, thereby sealing said closed fluid circuit, and
    wherein said valve member is raised apart from said valve seat due to hydraulic pressure in said closed fluid circuit dropping below pressure in said fluid sump, thereby supplying fluid from said fluid sump to said closed fluid circuit, and
    wherein said valve member is raised apart from said valve seat by movement of said draining operation member, thereby draining fluid from said closed fluid circuit to said fluid sump.

2. A hydrostatic transmission including an axial piston hydraulic motor, said hydraulic motor comprising:
    a cylinder block;
    a plurality of pistons fitted in said cylinder block;
    a thrust bearing serving as a swash plate abutting against heads of said pistons;
    a motor shaft fitting with said cylinder block and extending from said cylinder block; and
    a bearing for said motor shaft, wherein said bearing for said motor shaft is disposed in said thrust bearing at substantially the same position with said thrust bearing in an axial direction of said motor shaft.

3. A hydrostatic transmission including a hydraulic motor, said hydrostatic transmission being contained together with a transmission shaft journalled by a bearing in a housing, said hydraulic motor comprising:
    an output shaft whose rotational force is transmitted to said transmission shaft;
    a cylinder block;
    a plurality of pistons fitted in said cylinder block;
    a swash plate abutting against heads of said pistons; and
    a retainer for retaining said swash plate, wherein said retainer integrally forms a supporter for supporting said bearing, said retainer including upwardly extending portions which contact a surface of a center section upon which said hydraulic motor is mounted.

4. The hydrostatic transmission according to claim 3, said retainer including a pair of feet, one of which serves as a first foot supporting said bearing for said transmission shaft, and the other which serves as a second foot fitted to an inside portion of said housing, wherein said retainer with said thrust bearing is reversible so as to select which of said pair of feet corresponds to either said first or second foot.

5. A hydrostatic transmission contained together with an axle in a housing, comprising
    a hydraulic pump including a cylinder block;
    a hydraulic motor including a cylinder block; and
    a center section forming therein a closed fluid circuit through which said hydraulic pump and said hydraulic motor are fluidly connected with each other,
    wherein the axle is disposed between said cylinder blocks of said hydraulic pump and said hydraulic motor and is dispensed perpendicularly to said cylinder blocks, and
    wherein an extended portion of said center section and an extended portion of said housing constitute a bearing for said axle, and
    wherein both said cylinder blocks of said hydraulic pump and said hydraulic motor are disposed substantially axially parallel to each other below said center section in said housing.

6. The hydrostatic transmission as set forth in claim 5, said housing comprising two portions joined together, each of said hydraulic pump and said hydraulic motor comprising a swash plate abutting against pistons fitted in said cylinder block, wherein one of said two portions of said housing supports both said swash plates.

7. The hydrostatic transmission as set forth in claim 5, further comprising:

a cylindrical fluid filter disposed substantially axially parallel to said cylinder blocks of said hydraulic pump and said hydraulic motor.

8. A hydrostatic transmission, comprising:

an axial piston hydraulic unit serving as a hydraulic pump or a hydraulic motor, said hydraulic unit including
- a vertically axial shaft, wherein said shaft is fixedly provided with a pin projecting from an outer peripheral surface of said shaft; and a center section including
- a fluid circuit for supplying fluid to said hydraulic unit,
- a bottom surface onto which said hydraulic unit is fitted,
- a vertical shaft hole being open at said bottom surface,
- a pin-passing groove disposed along said shaft hole, said pin-passing groove being open at said bottom surface, and
- a pin-retaining groove disposed at a top end of said pin-passing groove around said shaft hole, wherein said shaft is inserted into said center section through said shaft hole by passing said pin in said pin-passing groove, and wherein said shaft is axially located in said center section by locating said pin in said pin-retaining groove.

9. The hydrostatic transmission according to claim 8, wherein said pin-retaining groove is wider than said pin-passing groove in a peripheral direction of said shaft, and wherein said vertical shaft is rotated around its axis so as to offset said pin in said pin-retaining groove from said pin-passing groove, thereby preventing said shaft from dropping out of said center section.

* * * * *